United States Patent [19]

Panzica et al.

[11] Patent Number: 4,880,280
[45] Date of Patent: Nov. 14, 1989

[54] MOTORCYCLE WHEEL HUB AND FLANGE ASSEMBLY

[75] Inventors: Ignatius J. Panzica; Herbert W. Hoeptner, both of Morgan Hill, Calif.

[73] Assignee: Custom Chrome, Inc., Morgan Hill, Calif.

[21] Appl. No.: 211,917

[22] Filed: Jun. 27, 1988

[51] Int. Cl.[4] ............................................. B06B 27/02
[52] U.S. Cl. .............................. 301/105 B; 301/124 R
[58] Field of Search ............... 301/105 R, 105 B, 106, 301/111, 124 R, 124 H, 125

[56] References Cited

U.S. PATENT DOCUMENTS 4,424,981  1/1984  Maxwell III ................ 301/105 B X
4,763,957  8/1988  Poehlmann et al. ............ 301/105 B

FOREIGN PATENT DOCUMENTS 3302267   7/1984  Fed. Rep. of Germany ... 301/105 B
663982    8/1929  France .......................... 301/105 B
175558    1/1922  United Kingdom ............ 301/105 B
739643   11/1955  United Kingdom ............ 301/105 B

OTHER PUBLICATIONS

Section 12, pp. 286-294 of Custom Chrome Catalogue, 1987.

*Primary Examiner*—Russell D. Stormer
*Attorney, Agent, or Firm*—William W. Haefliger

[57] ABSTRACT

An improved hub assembly construction enables quick replacement of bearing and/or seal parts of a motorcycle wheel hub assembly; it basically includes a novel hub and flange for a motorcycle spoked wheel, and incorporates: a tubular hub adapted to be received and mounted on an axle, the hub defining an axis; two flanges rigidly mounted on the hub, the flanges having inner annular portions extending generally radially, and outer annular portions that extend angularly axially and radially, the outer portions defining holes spaced about the axis to receive spokes; the hub having opposite end portions and defining a bore between the end portions, and second counterbores at the respective end portions, each first counterbore located between the bore and a second counterbore; a bearing assembly located in each first counterbore, each such assembly including an annular outer race fittingly received axially by its respective first counterbore, an annular inner race spaced radially inwardly of the outer race, and rollers retaining between such races; a first tubular spacer located within the bore and having opposite ends respectively engageable with the inner races to position the inner races in axially spaced apart relation; the tubular spacer and inner races adapted to receive a wheel axle and to be mounted thereon, and the axle adapted to receive other annular spacers that urge the inner races toward the first tubular spacer, and projecting endwise externally of the hub to carry forks defined by the motorcycle frame; annular seals removably received in the second counterbores, and retainer structure removably mounted on the hub for retaining the seals in position in the second counterbores; whereby the bearing assemblies are easily endwise removable from the hubg after removal from the hub of the axle, the other annular spacers, the retainer structure, and the seals, for replacement thereof.

9 Claims, 3 Drawing Sheets

MOTORCYCLE WHEEL HUB AND FLANGE ASSEMBLY

BACKGROUND OF THE INVENTION

This invention relates generally to motorcycle wheel supports, and more particularly to a motorcycle front wheel hub assembly that is quickly and easily demountable for repair and replacement of parts.

In the past, motorcycle spoked wheel hub assemblies have lacked the unusually advantageous features of construction and operation as are now provided by the present invention. Unusual advantages of such features include quick demountability of the hub assembly, and quick re-assembly of its components, enabling replacement of such components such as bearings. In prior hubs, bearing balls were permanently installed in hubs, necessitating purchase and replacement of the entire hub assembly when one or more bearing balls failed. There has existed a need to eliminate this expensive and time consuming replacement, and which does not disturb spoke positioning.

SUMMARY OF THE INVENTION

It is a major object of the invention to provide an improved hub assembly construction which meets the above need and also enables quick replacement of bearing and/or seal parts of a motorcycle wheel hub assembly. Basically a novel hub and flange for a motorcycle spoked wheel is provided, and incorporates:

(a) a tubular hub adapted to be received and mounted on an axle, the hub defining an axis, (b) two flanges rigidly mounted on the hub, said flanges having inner annular portions extending generally radially, and outer annular portions that extend angularly axially and radially, the outer portions defining holes spaced about said axis to receive spokes, (c) the hub having opposite end portions and defining a bore between the end portions, and second counterbores at such respective end portions, each first counterbore located between the bore and a second counterbore, (d) a bearing assembly located in each first counterbore, each such assembly including an annular outer race fittingly received axially by its respective first counterbore, an annular inner race spaced radially inwardly of the outer race, and rollers retaining between such races, (e) a first tubular spacer located within the bore and having opposite ends respectively engagable with the inner races to position the inner races in axially spaced apart relation, (f) the tubular spacer and inner races adapted to receive a wheel axle and to be mounted thereon, and the axle adapted to receive other annular spacers that urge the inner races toward the first tubular spacer, and projecting endwise externally of the hub to carry forks defined by the motorcycle frame, (g) annular seal means removably received in the second counterbores, and retainer means removably mounted on the hub for retaining the seal means in position in said second counterbores, (h) whereby said bearing assemblies are easily endwise removable from the hub after removal from the hub of said axle, said other annular spacers, said retainer means, and said seal means, for replacement thereof.

The flange inner annular portions may be welded to the hub, or otherwise retained to it; an axle without axial shoulders in the hub is provided; and the removable bearings position the axle as well as tubular spacers on the axle, during clamp-up.

Further, the axle is typically received endwise through the annular seal means and through the inner races, the inner races mounted on the axle, the axle projecting endwise oppositely from opposite ends of the hub, the axle having a head and a nut thereon and at opposite ends thereof.

To aid such positioning of the removable bearings, they typically comprise rollers with axes tilted relative to the axle axis; thus the rollers of each bearing typically have axes that define a cone tapering toward the hub axis within said bore.

Finally, the flanges have outer turned portions to retain wheel spokes; and an inner portion of one flange has openings to receive fasteners that position a brake drum.

These and other objects and advantages of the invention, as well as the details of an illustrative embodiment, will be more fully understood from the following specification and drawings, in which:

DRAWING DESCRIPTION

DETAILED DESCRIPTION

Figure 1:
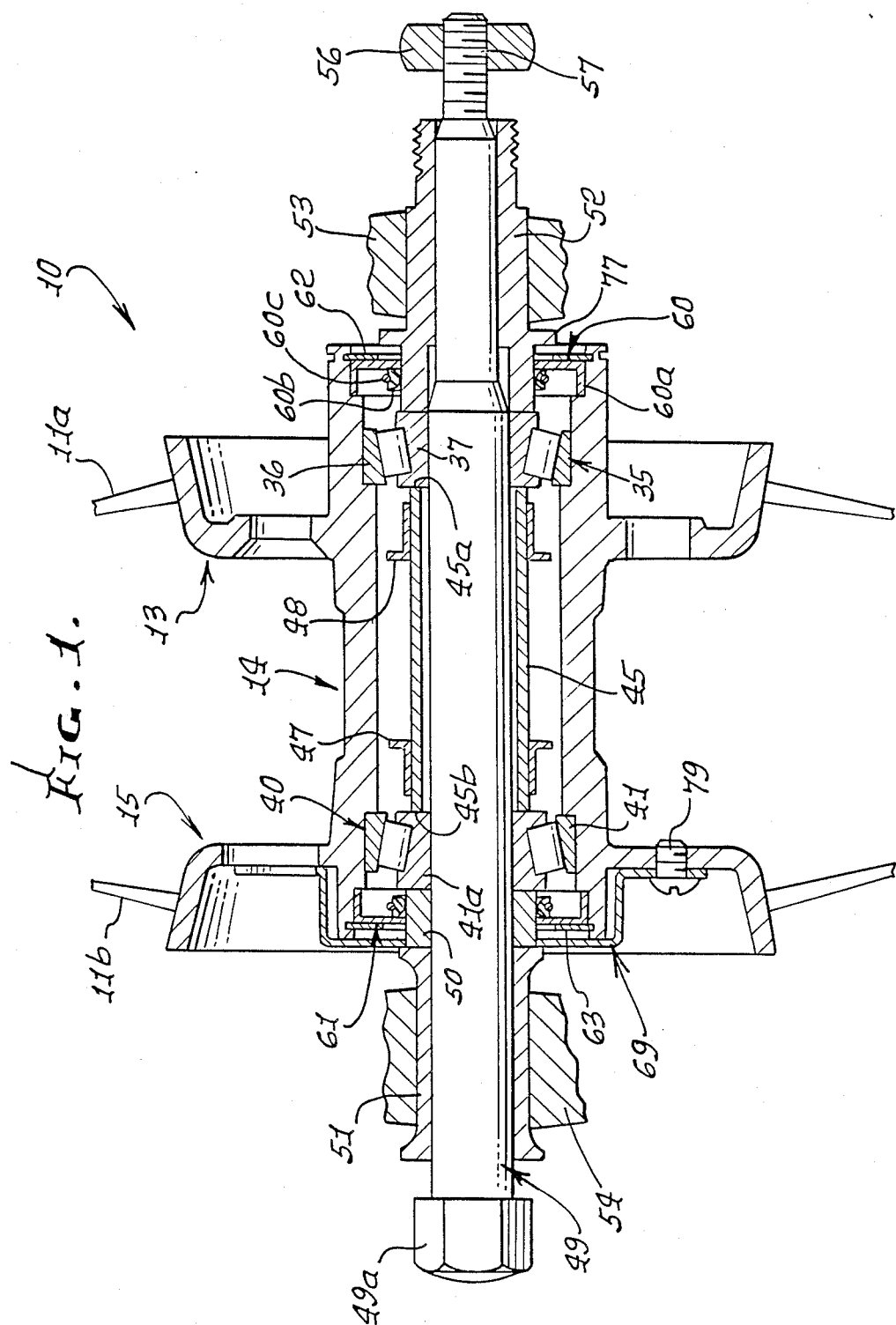
FIG. 1 is an elevation, in section, taken through an assembled axle and hub flange unit, embodying the invention.

In the drawings, the hub and flange unit 10 is constructed for use on a motorcycle wheel having spokes indicated at 11a and 11b. Spokes 11a connect at 12a with the outer annular portion 13a of right flange 13 on the hub 14, and spokes 11b connect with the outer annular portion 15a of the left flange 15 on the hub. Weldments 16 and 17 connect the radially extending inner annular portions 13b and 15b of the flanges 13 and 15, respectively, to the hub body portion 14a, and at axially spaced locations, as shown. Alternatively, the flanges may be formed integrally with the hub, i.e. without need for weldments. The hub and flanges consist of hardened steel, and they extend co-axially.

The hub has opposite end portions 14b and 14c, and defines a bore 20 extending between such end portions. A first counterbore 21 is formed at and within end portion 14b, with an annular step shoulder 22 located between one end of bore 20 and counterbore 21; and another first counterbore 23 is formed at end portion 14c with an annular step shoulder 24 located between the other end of bore 20 and counterbore 23. Second counterbores 25 and 26 are also formed at and within hub end portions 14b and 14c, as shown, and have associated step shoulders 27 and 28.

Annular bearing assemblies are located in the first counterbores, each such assembly including an annular outer race loosely received axially by its respective first counterbore, an annular inner race spaced radially inwardly of its outer race, and rollers retained between the races. See for example bearing assembly 35 including outer race 36 fitting in counterbore 21 and endwise engaging shoulder 22, inner race 37, and rollers 38 between the races. The latter are tapered, leftwardly as shown, and toward the axis in bore 20. See also bearing assembly 40 including outer race 41 fitting in counterbore 23 and endwise engaging step shoulder 24, inner race 41a and rollers 42 between the races. The latter are tapered, rightwardly as shown, and toward the axis in bore 20. The tapers of the bearings and cages 80 and 81 on the inner races tend to retain them in position under load. A first tubular spacer 45 is located within the bore 20 and has opposite ends 45a and 45b respectively engagable with the end walls of the inner races, as seen in FIG. 1, to position those races.

The spacer 45 has annular, radial locator flanges 47 and 48 mounted thereon, to engage bore 20 and locate the spacer radially, as during insertion of axle 49 through the hub, bearings, and spacers, to position as seen in FIG. 1. In this regard, the axle has no bearing engagement shoulders to engage the races, endwise. Flanges 47 and 48 allow limited radial play of the spacer 45 during axle insertion.

Other annular spacers 50–52 are mounted on the axle to urge the inner races axially endwise oppositely, and toward spacer 45, thereby to retain the outer races 36 and 41 against step shoulders 22 and 28, during clamp-up. FIG. 1 shows spacer 50 endwise engaging inner race 41a, and spacer 51 between spacer 50 and axle head 49a; and elongated tubular spacer 52 extending between race 37 and nut 56 threaded at 57 to the axle. Tightening of the nut exerts clamp-up force, positioning the elements as seen in FIG. 1.

Replacement of the axle and of the bearings is quickly and easily facilitated, merely by removing the nut from the rightward end of the axle, and endwise removing the axle, which has no axially facing shoulders to directly engage and position the inner races.

Figure 2:
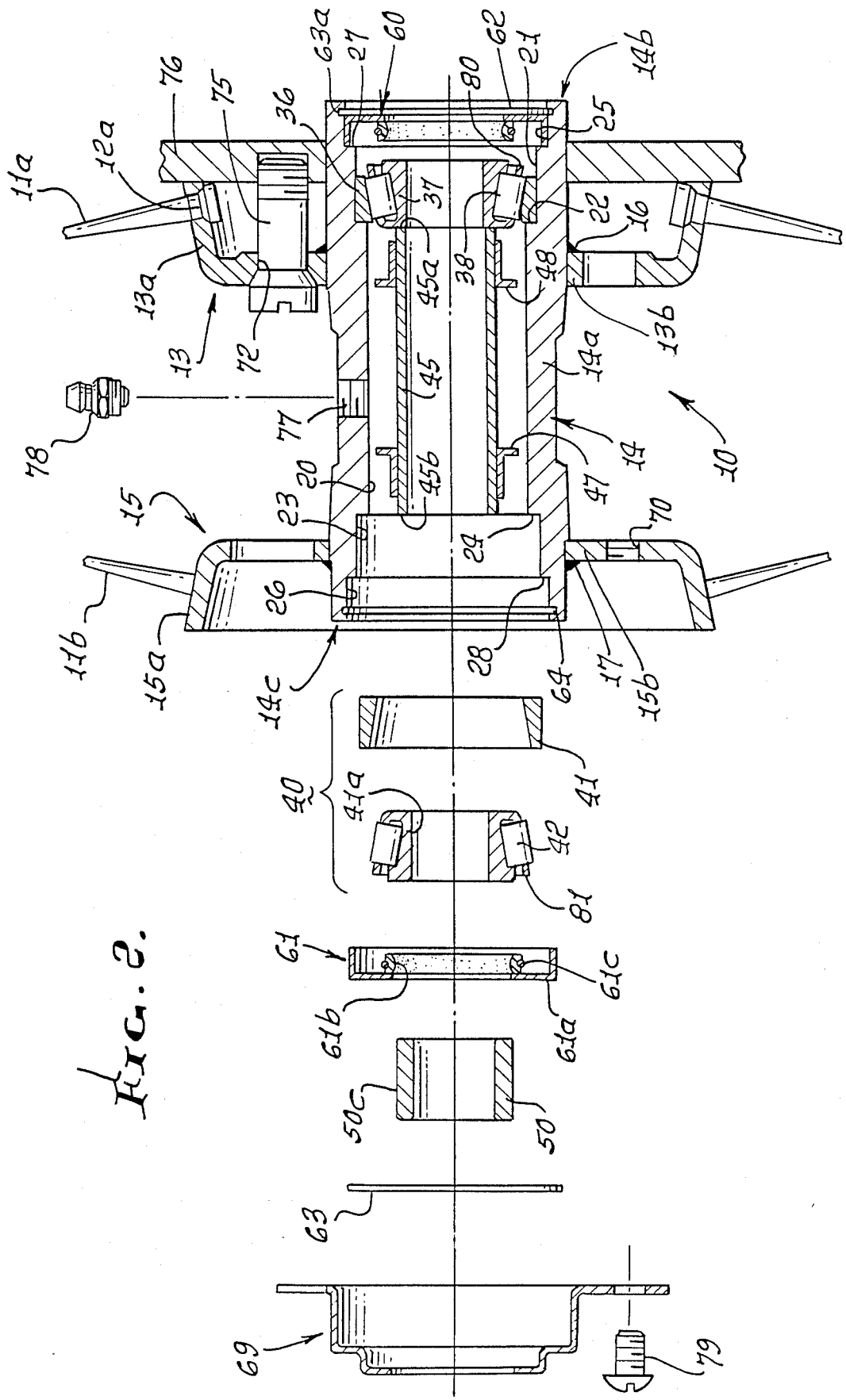
FIG. 2 is a view like FIG. 1, but showing the hub and flange unit with certain elements axially exploded.
Figure 3:
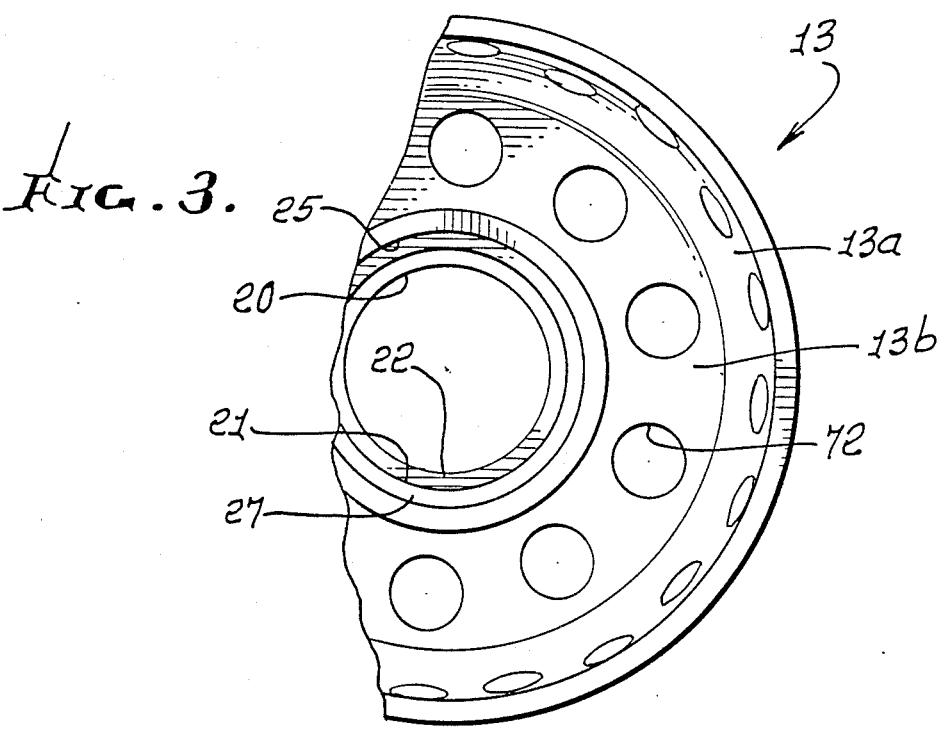
FIG. 3 is a fragmentary right end view of the right flange.
Figure 4:
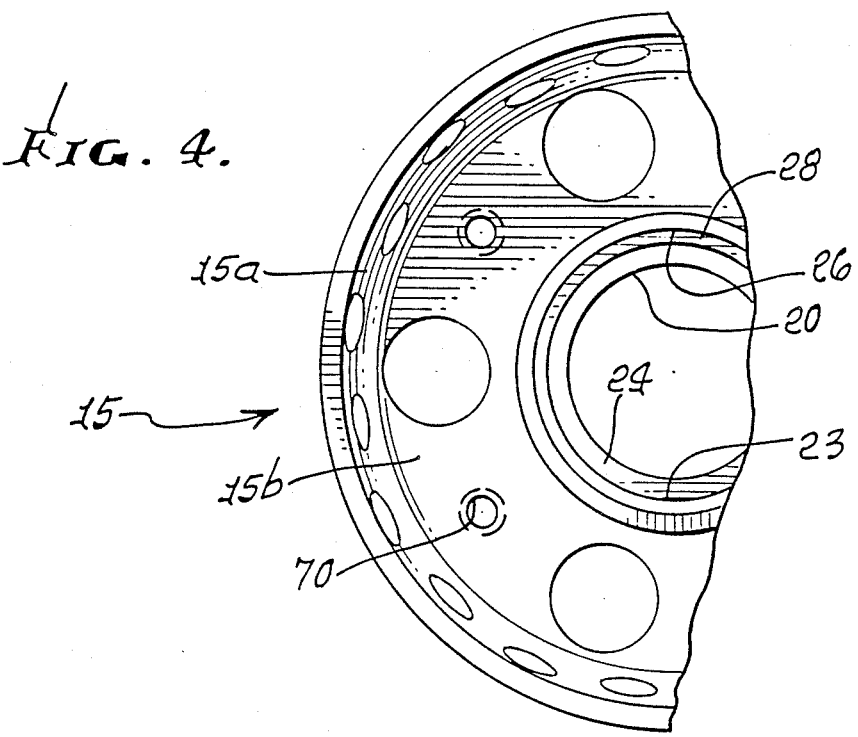
FIG. 4 is a fragmentary left end view of the left flange.

Also, shown and being quickly removable and replaceable as well, are annular seals 60 and 61 and retaining rings 62 and 63 therefor. Seal 60 fits in second counterbore 25, with retaining ring 62 fitting in groove 63a in the second counterbore 25 and retaining that seal against step shoulder 27. Seal 61 fits in second counterbore 26, with retaining ring 63 fitting in groove 64 in the second counterbore 26 and retaining that seal against step shoulder 28. An annular cap 69 fits over the left end of the hub body to enclose the seal 61, and is attached by fasteners 79 to the flange inner portion 15b, as via through openings 70 in that flange. See FIGS. 1 and 2. A grease fitting 78 fits in hub port 77, to allow grease input to bore 20, to lubricate the bearings.

Spacers 50 and 52 have smooth cylindrical outer surfaces to support motorcycle frame forks, indicated at 53 and 54; and openings 72 in the flange radially extending inner portion 13b are adapted to receive fasteners 75 attaching to an annular brake drum 76.

Note outer flange 177 on the spacer 52, which endwise protects the seal 60. Seal 60 includes a metallic cup 60a, and a cantilever rubber ring 60b attached to the cup and urged inwardly by a spring 60c to engage the outer surface 52c of spacer 52. Seal 61 also includes a metallic cup 61a, a cantilever rubber ring 61b attached to cup 61a, and urged inwardly by a spring 61c to engage the outer surface 50c of spacer 50.

We claim:

1. In a hub and flange unit for a spoked motorcycle wheel, associated with a motorcycle frame having forks, the combination comprising
   (a) an axle and a tubular hub defining an axis and axially receiving the axle,
   (b) two flanges rigidly mounted on the hub, said flanges having inner annular portions extending generally radially, and outer annular portions that extend angularly axially and radially, said outer portions defining holes spaces about said axis to receive spokes,
   (c) the hub having opposite end portions and defining a bore between said end portions, first counterbores at said respective end portions, and second counterbores at said respective end portions, each first counterbore located between the bore and a second counterbore,
   (d) a bearing assembly located in each first counterbore, each said assembly including an annular outer race fittingly received axially by its respective first counterbore, an annular inner race spaced radially inwardly of the outer race, and rollers retained between said races,
   (e) a first tubular spacer located within said bore and having opposite ends respectively engageable with the inner races to position said inner races in axially spaces apart relation,
   (f) the tubular spacer and said inner races received on said axle and mounted thereon, there being other annular spacers that are received on the axle and that urge the inner races toward the first tubular spacer, and the axle projecting endwise externally of the hub to carry said forks defined by the motorcycle frame,
   (g) annular seal means removably received in said second counterbores, and retainer means removably mounted on the hub for retaining said seal means in position in said second counterbores,
   (h) whereby said bearing assemblies are easily endwise removable from the hub after removal from the hub of said axle, said other annular spacers, said retainer means, and said seal means, for replacement thereof.

2. The hub and flange unit of claim 1 wherein the flange inner annular portions are welded to said hub.

3. The hub and flange unit of claim 1 wherein said other spacers on the axle engage the inner races and urge them axialy toward opposite ends of the first tubular spacer, in response to clamping forces exerted at the axle.

4. The hub and flange unit of claim 1 including locator flanges mounted on and projecting radially from the first tubular spacer for engagement with the hub bore, said locator flanges allowing radial play of the first tubular spacer within said bore but locating the first tubular spacer generally coaxially with the bore, for ease of reception of the axle therethrough.

5. The hub and flange unit of claim 1 wherein said bearing rollers of each bearing assembly have axes that define a cone tapering toward the hub axis within said bore.

6. The hub and flange unit of claim 1 wherein at least one of said flange inner annular portions defines circularly spaced through openings extending parallel to the hub axis, for reception of brake drum retention and locator means.

7. The hub and flange unit of claim 6 including said brake drum retention and locator means extending in said through openings, and a brake drum associated therewith.

8. In a hub and flange unit for a spoked motorcycle wheel, the combination comprising (a) a tubular hub adapted to be received and mounted as an axle, the hub defining an axis,
(b) two flanges rigidly mounted on the hub, said flanges having inner annular portions extending generally radially, and outer annular portions that extend angularly axially and radially, said outer portions defining holes spaced about said axis to receive spokes,
(c) the hub having opposite end portions and defining a bore between said end portions, first counterbores at said respective end portions, and second counterbores at said respective end portions, each first counterbore located between the bore and a second counterbore,
(d) a bearing assembly located in each first counterbore, each said assembly including an annular outer race fittingly received axially by its respective first counterbore, an annular inner race spaced radially inwardly of the outer race, and rollers retained between said races,
(e) annular seal means removably received in said second counterbores, and retainer means removably mounted on the hub for retaining said seal means in position in said second counterbores;
(f) an axle received endwise through said annular seal means and through said inner races, the inner races mounted on the axle, the axle projecting endwise oppositely from opposite ends of the hub, the axle having a head and a nut thereon and at opposite ends thereof,
(g) annular spacers on the axle between the head and one of the inner races, and between the nut and the other of the inner races, thereby positioning said races upon tightening of the nut, the axle having a uniform diameter outer cylindrical surface within substantially the entirety of the hub.

9. The hub and flange unit of claim 8 including a tubular spacer on the axle, and between the inner races.

* * * * *